(12) United States Patent
Niesel et al.

(10) Patent No.: US 9,190,943 B2
(45) Date of Patent: Nov. 17, 2015

(54) ELECTRIC CIRCUIT FOR GENERATING ELECTRIC POWER

(75) Inventors: Norbert Niesel, Berlin (DE); Jochen Kreher, Berlin (DE); Thomas Neitzel, Berlin (DE); Thomas Kasztelan, Berlin (DE)

(73) Assignee: GE Energy Power Conversion Technology Limited (GB)

( * ) Notice: Subject to any disclaimer, the term of this patent is extended or adjusted under 35 U.S.C. 154(b) by 559 days.

(21) Appl. No.: 12/923,883

(22) Filed: Oct. 13, 2010

(65) Prior Publication Data

US 2011/0109277 A1 May 12, 2011

(30) Foreign Application Priority Data

Nov. 10, 2009 (DE) .......................... 10 2009 052 632

(51) Int. Cl.
*H02P 9/10* (2006.01)
*H02P 9/00* (2006.01)

(52) U.S. Cl.
CPC ................ *H02P 9/007* (2013.01); *H02P 9/102* (2013.01); *Y02E 10/725* (2013.01)

(58) Field of Classification Search
CPC ................................. H02P 9/007; H02P 9/102
USPC ........... 322/44, 24, 28; 700/286–288; 290/44, 290/55; 416/1; 415/1
See application file for complete search history.

(56) References Cited

U.S. PATENT DOCUMENTS

| | | | | |
|---|---|---|---|---|
| 4,897,561 | A * | 1/1990 | Saigo et al. | 307/413 |
| 6,316,905 | B1 * | 11/2001 | Depenbrock | 318/801 |
| 7,009,361 | B2 * | 3/2006 | Iotti | 318/799 |
| 2002/0158658 | A1 * | 10/2002 | Godbersen | 324/772 |
| 2004/0019439 | A1 | 1/2004 | El-Ibiary | |
| 2007/0278797 | A1 | 12/2007 | Flannery et al. | |
| 2009/0201620 | A1 * | 8/2009 | Gray et al. | 361/159 |
| 2009/0206606 | A1 | 8/2009 | Jorgensen et al. | |
| 2010/0117605 | A1 * | 5/2010 | Kretschmann | 322/28 |
| 2011/0057444 | A1 * | 3/2011 | Dai et al. | 290/44 |
| 2013/0009611 | A1 * | 1/2013 | Tripathi et al. | 322/23 |

FOREIGN PATENT DOCUMENTS

DE   10 2007 014 728   10/2008
EP           0704709 A2   4/1996

(Continued)

OTHER PUBLICATIONS

Im Won-Sang et al., "Analysis and Compensation of Current Measurement Errors in a Doubly Fed Induction Generator", 2009 IEEE, pp. 1713-1719.

(Continued)

*Primary Examiner* — Tulsidas C Patel
*Assistant Examiner* — Viet Nguyen
(74) *Attorney, Agent, or Firm* — Parks Wood LLC

(57) ABSTRACT

An electric circuit is described for generating electric power. In this circuit, an asynchronous generator includes a stator and a rotor. On the stator side, the asynchronous generator is coupled to a power grid. The rotor current flowing to the rotor of the asynchronous generator can be measured. A control device is designed such that, in case of a fault in the power grid, the stator current flowing to the stator of the asynchronous generator is calculated from the measured rotor current as a function of parameters of the asynchronous generator.

9 Claims, 1 Drawing Sheet

(56) References Cited

FOREIGN PATENT DOCUMENTS

| | | | |
|---|---|---|---|
| KR | 20030077354 A | 10/2003 | |
| WO | WO 2008/064472 | 6/2008 | |
| WO | WO 2008116769 A2 * | 10/2008 | ............... H02P 9/00 |
| WO | WO 2010049412 A1 * | 5/2010 | |

OTHER PUBLICATIONS

European Search Report dated Feb. 25, 2013.
EP Office Action dated Mar. 6, 2014 issued in connection with corresponding EP Patent Application No. 10185259.8.

* cited by examiner

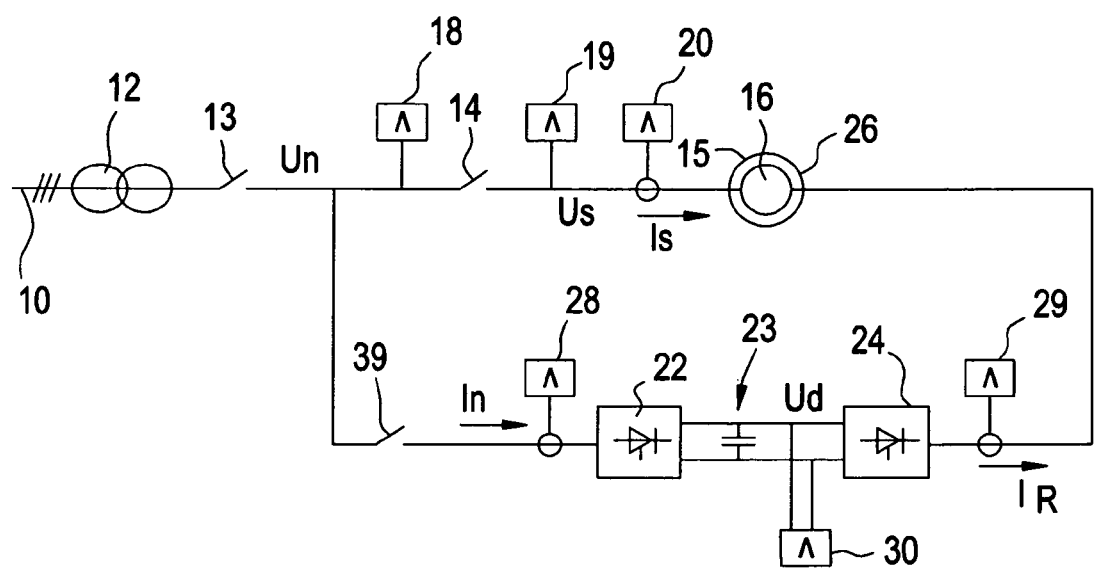

ELECTRIC CIRCUIT FOR GENERATING ELECTRIC POWER

PRIORITY STATEMENT

The present application hereby claims priority under 35 U.S.C. §119 on German patent application number DE 10 2009 052 632.3 filed Nov. 10, 2009, the entire contents of which are hereby incorporated herein by reference.

FIELD

The invention relates to a method for operating an electric circuit for generating electric power, in which an asynchronous generator has a stator and a rotor in which the asynchronous generator is coupled on the stator side to a power grid, and in which the rotor current flowing to the rotor of the asynchronous generator is measured. The invention likewise relates to a corresponding electric circuit for generating electric power and to a control device for a corresponding circuit.

BACKGROUND

A method of this kind and an electric circuit of this kind are known, for example, from DE 10 2007 014 728 A1. The stator current flowing to the stator and the rotor current flowing to the rotor are measured by means of sensors and then taken into account in the open-loop and/or closed-loop control of the circuit.

In case of a fault in the power grid, in particular after a collapse in the mains voltage, the measurement of the stator current can be inaccurate or even incorrect. The open-loop and/or closed-loop control of the circuit can thus lead to considerable control errors and thus potentially cannot be continued on the basis of the stator current.

SUMMARY

It is the object of the invention to create method of the kind described above with which a largely correct stator current is available, even in case of a fault in the power grid.

The invention achieves this object by a method according to claim 1.

According to the invention, in a method of the kind specified above, in case of a fault in the power grid, the stator current flowing to the stator of the asynchronous generator is calculated from the measured rotor current as a function of parameters of the asynchronous generator.

The invention is based on the finding that the asynchronous generator in principle can also be viewed as a transformer having a specified transmission ratio, and that thus in case of a fault in the power grid, the stator current can be calculated from the rotor current by means of the transmission ratio. By means of the parameters of the asynchronous generator, the ratio of the stator current to the rotor current, and if necessary, the position of the particular pointer in the particular reference system, can be taken into account in a simple manner.

It is essential that the measurement of the rotor current be largely correct, even in case of a collapse in the mains voltage of the power grid, so that the stator current calculated from the measured rotor current is substantially correct.

This brings the added advantage that the inaccurate or even incorrectly measured stator current does not have to be used, but rather that by means of the invention a precise stator current, calculated from the measured rotor current, is available. The open-loop and/or closed-loop control of the entire circuit can thus be continued, even in case of a fault in the power grid, with substantially consistent accuracy based on the calculated stator current.

In an advantageous embodiment of the invention, the stator current flowing to the stator of the asynchronous generator is calculated according to the following equation:

$$\begin{bmatrix} i_{S\_a} \\ i_{S\_r} \end{bmatrix} = \frac{X_h * X_S}{R_S^2 + X_S^2} \begin{bmatrix} -1 & \frac{R_S}{X_S} \\ -\frac{R_S}{X_S} & -1 \end{bmatrix} * \begin{bmatrix} i_{R\_a} \\ i_{R\_r} + i_{\mu 0} \end{bmatrix}$$

having the following parameters:

$i_{S\_a}$ stator active current
$i_{S\_r}$ stator reactive current
$i_{R\_a}$ rotor active current
$i_{R\_r}$ rotor reactive current
$i_{\mu 0}$ magnetizing current
$R_s$ stator active resistance
$X_s$ stator reactance
$X_h$ reactance By means of this equation, the stator current can be calculated from the rotor current in a simple manner.

In an additional advantageous embodiment of the invention, during error-free operation of the power grid, the stator current is calculated from the measured rotor current, then the measured stator current and the calculated stator current are compared, and the parameters of the asynchronous generator are varied as a function thereof. In this manner, the parameters of the asynchronous generator can be gradually optimized during error-free operation of the power grid, so that in the case of a fault in the power grid, the stator current then calculated from the measured rotor current is largely accurate and correct.

BRIEF DESCRIPTION OF THE DRAWINGS

Additional characteristics, possible applications and advantages of the invention will be apparent from the following description of exemplary embodiments of the invention which are illustrated in the drawing. All described or illustrated characteristics, either alone or in any combination, form the subject matter of the invention, regardless of the combination thereof in the claims or the dependencies thereof, and regardless of the formulation and/or disclosure thereof in the description and/or in the drawing.

The single FIGURE in the drawing shows a schematic block diagram of one exemplary embodiment of an electric circuit according to the invention for generating electric power.

DETAILED DESCRIPTION OF THE EXAMPLE EMBODIMENTS

A three-phase power grid 10 is connected to a transformer 12 and a switch 13, to which furthermore a stator switch 14 is connected, which in turn is connected to the stator 15 of an asynchronous generator 16. The stator switch 14 can be any kind of controllable electric and/or electronic switch which is capable of carrying and interrupting the current and/or the voltage between the transformer 12 and the stator 15. In particular, the stator switch 14 can be an electric and/or electronic power semiconductor component which is constructed, for example, from a thyristor or an IGBT (insulated gate bipolar transistor) or the like.

In order to measure the mains voltage Un, a voltage sensor 18 is provided on the mains side of the stator switch 14. In order to measure the stator voltage Us, an additional voltage sensor 19 is provided on the stator side of the stator switch 14. Furthermore, on the stator side also a current sensor 20 is present, which measures the stator current $I_s$ flowing over the stator switch 14. The stator current $I_s$ is composed of the stator active current and a stator reactive current.

At the connection point of the switch 13 and stator switch 14, a mains-side inverter 22, in particular a pulse inverter, is connected, which is connected via a two-pole D.C. intermediate circuit 23 to a rotor-side inverter 24, in particular, to a pulse inverter. The rotor-side inverter 24 is additionally connected to the rotor 26 of the asynchronous generator 16. The mains-side inverter 22 and the rotor-side inverter 24 can have arbitrary and different designs, in particular they may be circuits having a plurality of semiconductor components, for example, diodes or transistors or the like. The intermediate circuit 23 is provided for storing of a direct voltage and comprises in particular one or more capacitors. In addition, it is possible that the mains-side inverter 22, the intermediate circuit 23 and the rotor-side inverter 24 are designed as so-called two- or multi-level array.

In order to measure the current In flowing over the mains-side inverter 22, a current sensor 28 is provided on the mains side of the mains-side inverter 22. In order to measure the rotor current $I_R$ flowing over the rotor-side inverter 24, an additional current sensor 29 is provided on the rotor side of the rotor-side inverter 24. The rotor current $I_R$ is composed of a rotor active current and a rotor reactive current.

Between the rotor-side inverter 24 and the intermediate circuit 23 a voltage sensor 30 is provided, which can be used to measure the intermediate circuit voltage Ud. A mains switch 39 is located between the transformer 12 and the mains-side inverter 22.

The measured signals of the mains voltage Un, of the stator voltage Us, of the intermediate circuit voltage Ud, of the current In flowing over the mains-side inverter 22, of the stator current $I_S$ and of the rotor current $I_R$ are fed as input signals to an open-loop/closed-loop control process carried out by a control device. This open-loop/closed-loop control generates output signals which are used to actuate the stator switch 14, the mains-side inverter 22 and the rotor-side inverter 24, and also the mains switch 39.

The open-loop/closed-loop control of the control device influences the mains-side inverter 22 and the rotor-side inverter 24 to the effect that the intermediate circuit voltage Ud corresponds as closely as possible to a specified rated voltage.

The circuit described herein and illustrated in the FIGURE is a so-called double-fed asynchronous generator 16 having a grid-coupled stator 15. This circuit is used, in particular, in power generating facilities, for example, in wind power or hydropower or gas turbine power generating facilities.

During normal operation of this circuit, the stator switch 14 and the mains switch 39 are set as conducting. If the rotor 26 is caused to perform a rotational motion by an external force, for example, by wind or water or steam or the like, a voltage is induced in the stator 15, which is fed via the stator switch 14 into the power grid 10. The adjustment, in particular the synchronization of the voltage induced in the stator 15 to the mains voltage Un of the power grid 10, is achieved by way of the open-loop/closed-loop control by appropriately actuating the mains-side inverter 22 and the rotor-side inverter 24.

In order to start the operation of the power generating facility, the intermediate circuit 23, that is, in particular the capacitor or capacitors located therein, is or are charged in a manner which is not described in detail. As soon as a desired voltage is present in the intermediate circuit 23, the mains switch 39 is switched to the conductive state thereof. The stator switch 14 remains open. When the rotor 26 is rotating and has substantially reached the rated speed thereof, the rotor-side inverter 24 begins to magnetize the rotor 26 of the asynchronous generator 16, so that a voltage is induced from the rotor 26 to the stator 15. The stator voltage Us and the mains voltage Un are synchronized by the open-loop/closed-loop control. As soon as this is attained, the stator switch 14 is switched into the conductive state thereof, and current flows into the power grid 10. Now the circuit is in the normal operating mode. While during magnetizing of the asynchronous generator 16 typically the rotor currents are controlled, during normal operation the stator currents are usually controlled.

If a fault occurs in the power grid 10 during normal operation, in particular in case of a collapse of the mains voltage Un, it is provided for the open-loop/closed-loop control to influence the mains-side inverter 22 and the rotor-side inverter 24 to the effect that at least an active current continues to be fed into the power grid 10 from the circuit shown in the FIGURE. This is frequently also referred to as 'fault ride-through (FRT)' operation.

As in normal operation, it is also necessary in FRT operation that the control device and/or the open-loop/closed-loop control process the stator current $I_s$ measured by the current sensor 20. However, in particular in the event of a collapse of mains voltage Un, the stator current $I_s$ will become very large. As a result, the current sensor 20, which is usually designed as a current transformer and which is provided for measuring the stator current $I_s$, goes into saturation and the measured value produced by the current sensor 20 is no longer correct. In case of a collapse in mains voltage Un, therefore the open-loop/closed-loop control no longer uses the stator current $I_s$.

Instead, in general the following approach is used:

In case of a fault in the power grid 10, in particular in case of a collapse in mains voltage Un, as was explained above, the stator current $I_s$ becomes very large and contains a direct current component. The A.C. transformer normally used as a current sensor 20 for the stator current $I_S$ thus goes into saturation. But this is not the case for the rotor current $I_R$, since usually active current transformers are normally always used here.

Thus, in case of a fault, the measured rotor current $I_R$ is converted into the stator current $I_S$, and specifically as a function of the specified ratio of the stator current $I_S$ to the rotor current $I_R$. This specified ratio in turn, is dependent on parameters of the asynchronous machine 16. Overall this means that the stator current $I_S$ calculated from the measured rotor current $I_R$ as a function of parameters of the asynchronous generator 16.

Specifically, the stator current $I_S$ is calculated according to the following equation G:

$$\begin{bmatrix} i_{S\_a} \\ i_{S\_r} \end{bmatrix} = \frac{X_h * X_S}{R_S^2 + X_S^2} \begin{bmatrix} -1 & \frac{R_S}{X_S} \\ -\frac{R_S}{X_S} & -1 \end{bmatrix} * \begin{bmatrix} i_{R\_a} \\ i_{R\_r} + i_{\mu 0} \end{bmatrix}$$

The parameters in this equation G have the following meanings:

$i_{S\_a}$ stator active current
$i_{S\_r}$ stator reactive current
$i_{R\_a}$ rotor active current $i_{R\_r}$ rotor reactive current
$i_{\mu 0}$ magnetizing current
$R_s$ stator active resistance
$X_s$ stator reactance
$X_h$ reactance of the main inductivity.

The stator active current $i_{S\_a}$ and stator reactive current $i_{S\_r}$ are calculated by means of equation G. The rotor active current $i_{R\_a}$ and rotor reactive current $i_{R\_r}$ are measured by means of the current sensor 29. The magnetizing current $i_{\mu 0}$ is determined in advance, and specifically as a characteristic curve that is dependent on the mains voltage Un. Based on the measurement of the mains voltage Un with the aid of the voltage sensor 18, during operation of the circuit shown in the FIGURE magnetizing current $i_{\mu 0}$ can be taken from this characteristic curve.

The $R_s/X_s$ ratio can be determined in advance. To do so, the circuit shown in the FIGURE can be operated at a stator reactive current equal to zero, that is, $i_{S\_r}=0$, in a range of higher power, preferably at the rated power. From equation G above, the $R_s/X_s$ ratio can then be calculated as follows from the measured currents:

$$R_S/X_S = -(i_{R\_r} + i_{\mu 0})/i_{R\_a}.$$

The $(X_h * X_S)/(R_S^2 + X_S^2) \approx X_h/X_S$ ratio can likewise be determined in advance. To do so, the determined $R_S/X_S$ ratio can be inserted into equation G above, and specifically into that portion of the equation for the stator active current $i_{S\_a}$. This results in the following:

$$X_h/X_S = -(i_{S\_a} * i_{R\_a})/(i_{R\_a}^2 (i_{R\_r} + i_{\mu 0})^2).$$

During operation of the circuit shown in the FIGURE, preferably in an operating range having larger currents, the stator current $I_S$ and the rotor current $I_R$ are measured if no fault is present in the power grid 10. During this error-free operation, the $R_S/X_S$ and $X_h/X_S$ ratios, as explained above, are determined so that by means of the measured rotor current $I_R$, the stator current $I_S$ can be calculated according to equation G. Next, a comparison of the measured stator current $I_S$ and of the stator current $I_S$ determined by way of equation G is performed. Based on this comparison, to the extent necessary, the parameters of equation G, in particular the magnetizing current $i_{\mu 0}$ and the $R_S/X_S$ and $X_h/X_S$ ratios, can be varied, particularly they can be improved with a view toward optimizing. If after this optimization a fault occurs in the power grid 10, the stator current $I_S$ can be calculated based on the optimized parameters according to equation G, without this causing any significant error.

Alternatively, instead of the described calculation of the $R_S/X_S$ and $X_h/X_S$ ratios, it is possible to begin with starting values for these ratios. For example, the $R_S/X_S$ ratio can be selected to be zero, and the $X_h/X_S$ ratio can be selected to be equal to one, that is, $R_S/X_S=0$ and $X_h/X_S=1$. Likewise, it is possible to read or to derive the starting values from the data sheets of the asynchronous generator 16. Proceeding from starting values of this kind, an optimization can then be performed according to the procedure described above.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operating an electric circuit for generating electric power, in which an asynchronous generator includes a stator and a rotor, the method comprising:

measuring, a rotor current flowing to the rotor and a stator current flowing to the stator, during a fault-free operation of the power grid;

calculating, during the fault-free operation, a stator current based on specified ratios of the rotor current measured, the stator current measured and a magnetizing current;

determining differences between the stator current measured and the stator current calculated, and adjusting the specified ratios based on the difference; and calculating, during a power grid fault, a stator current to flow to the stator based on the adjusted specified ratios.

2. A method according to claim 1, wherein the stator current calculated is a function of the specified ratio which include an Rs/Xs ratio, where Rs=stator active resistance and Xs=stator reactance.

3. The method according to claim 2, wherein the Rs/Xs ratio is obtained from a datasheet of the asynchronous machine or is set to zero.

4. A method according to claim 1, wherein the stator current calculated is a function of the specified ratio which include a Xh/Xs ratio, where Xh=main line inductivity reactance and Xs=stator reactance.

5. The method according to claim 4, wherein the $X_h/X_s$ ratio is obtained from a datasheet of the asynchronous machine or is set to be equal to "1".

6. The method according to claim 1, wherein the magnetizing current is determined from a characteristic curve that is dependent on a main voltage of the power grid.

7. A method according to claim 1, wherein the stator current flowing to the stator of the asynchronous generator is calculated according to the following equation:

$$\begin{bmatrix} i_{S\_a} \\ i_{S\_r} \end{bmatrix} = \frac{X_h * X_S}{R_S^2 + X_S^2} \begin{bmatrix} -1 & \frac{R_S}{X_S} \\ -\frac{R_S}{X_S} & -1 \end{bmatrix} * \begin{bmatrix} i_{R\_a} \\ i_{R\_r} + i_{\mu 0} \end{bmatrix}$$

having the following parameter;
$i_{S\_a}$ stator active current
$i_{S\_r}$ stator reactive current
 $i_{R\_a}$ rotor active current
 $i_{R\_r}$ rotor reactive current
 $i_{\mu 0}$ magnetizing current
 $R_S$ stator active resistance
 $X_S$ stator reactance
 $X_h$ main line inductivity reactance.

8. A control device of an electric circuit, the electric circuit being for generating electric power, using an asynchronous generator that includes a stator and a rotor, the control device comprising:

a controller configured to:

obtain a measured rotor current flowing to the rotor and a stator current flowing to the stator, during fault-free operation of the power grid, calculate during the fault-free operation, a stator current based on specified ratios of the rotor current measured, the stator current measured and a magnetizing current, determine differences between the stator current measured and the stator current calculated and adjust the specified ratios based on the difference, and calculate, during a power grid fault, a stator current to flow to the stator based on the adjusted specified ratios.

9. An electric circuit for generating electric power, in which an asynchronous generator includes a stator and a rotor, the electric circuit comprising:

a first measuring device configured to measure a rotor current, flowing to the rotor during a fault-free operation of the power grid;

a second measuring device configured to measure a stator current, flowing to the stator during a fault-free operation of the power grid; and a control device configured to:

calculate during the fault-free operation, a stator current based on specified ratios of the rotor current measured, the stator current measured and a magnetizing current, determine differences between the stator current measured and the stator current calculated and adjust the specified ratios based on the difference, and calculate, during a power grid fault, a stator current to flow to the stator based on the adjusted specified ratios.

* * * * *